Sept. 11, 1956     J. PUHR-WESTERHEIDE     2,762,610
TUBE SURFACE CLEANING APPARATUS FOR TUBULAR HEAT EXCHANGERS
Filed Oct. 17, 1952     2 Sheets-Sheet 1
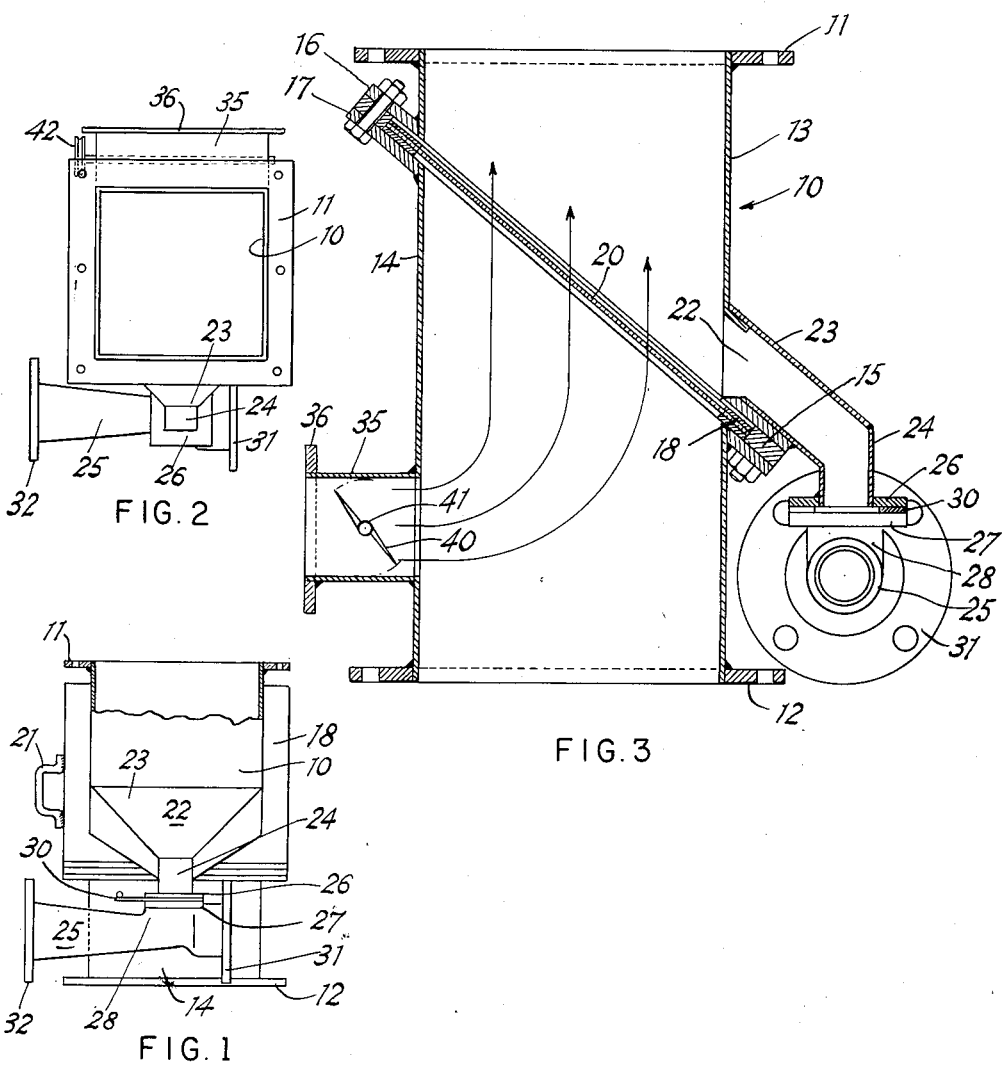
INVENTOR
Jurgen Puhr-Westerheide
BY
J. P. Moran
ATTORNEY United States Patent Office 2,762,610
Patented Sept. 11, 1956

2,762,610

TUBE SURFACE CLEANING APPARATUS FOR TUBULAR HEAT EXCHANGERS

Jurgen Puhr-Westerheide, Oberhausen, Germany, assignor to The Babcock & Wilcox Company, New York, N. Y., a corporation of New Jersey Application October 17, 1952, Serial No. 315,304

8 Claims. (Cl. 257—1)

This invention relates to apparatus for cleaning the gas contacted surfaces of tubular heat exchangers by relatively hard pellets striking such surfaces to dislodge deposited solids therefrom, the pellets being collected and returned for re-use. More particularly, the invention is directed to a novel method of and apparatus for separating the collected solids from the pellets before the latter are returned.

In one important class of tubular heat exchangers, heat transfer is effected by heated gases flowing over the exterior surfaces of metal tubes through which flow relatively cooler liquids or vapors. A typical example is a water tube steam boiler or vapor generator, in which heat from combustion gases flowing over the tubes is used to convert the liquid to vapor and frequently to superheat the vapor. The combustion gases may be further utilized to reheat cooled vapor, to preheat the combustion air, and to preheat the liquid entering the generator.

The heating gases are produced by the combustion of a suitable fuel, usually coal, gas, or fuel oil, in the presence of combustion supporting air. Depending upon the characteristics of the fuel and upon the efficiency of combustion, the resultant combustion gases flowing through the gas passes of the heat exchanger carry a certain amount of solids in suspension. A typical solid customarily present is fly ash.

As the gases flow over the relatively cooler tubes, the solids tend to deposit on the tube surfaces. As these deposits build up, they correspondingly reduce the efficiency of heat transfer from the gases to the tubes and, if not removed, may eventually bridge inter-tube spaces and partially block the gas passes. Hence, it is desirable to remove these deposited solids either at intervals whose frequency is determined by the rate of growth of the solids or at regular intervals.

One arrangement for removing these deposits from the tube surfaces involves discharging relatively hard pellets over the tube surfaces to dislodge the solids therefrom. These pellets may be distributed from a spreader to fall by gravity over the tubes. The pellets and the dislodged solids descend by gravity into the ash hopper arranged beneath the heat exchange surfaces. As the pellets represent an item of expense, both in first cost and in disposal costs, it is desirable to recover the same for re-use. This is particularly true in the case where the pellets are manufactured balls of metal or other hard substances. To recover the pellets, a suitable separator is arranged across the path of flow through the ash hopper to separate the pellets from the dislodged solids. This separator is usually a screen arranged to retain the pellets while passing the solids, the pellets passing from the screen to a suitable pneumatic or mechanical conveyor means for return to the pellet distribution means.

However, a proportion of the dislodged solids tends to cling or adhere to the pellets, being carried into the conveyor means. This imposes an increased load on the latter and also on the pellet distribution means, thus increasing the power requirements of the cleaning arrangement.

In accordance with the present invention, a novel method and means is provided for cleaning solids from the pellets before the latter pass from the separator or screen to the return conveyor means. This is effected by controllably admitting gas into the discharge passage beneath the screen. The furnace draft causes this gas to flow upwardly through the screen, and the flow rate is controlled so that the gas flow through the screen is sufficient to inhibit passage of the solids downwardly with the pellets counter to the gas flow.

Such gas flow is provided only during the tube cleaning period and, when the cleaning is terminated, the gas flow upwardly through the screen is cut off. The dislodged solids can then pass downwardly and through the screen to a wet conveyor or the like. The screen is preferably removable to clean accumulated solids therefrom.

If the combustion gases are at a temperature level such that introduction of the pellet cleaning gas into the gas passes will not lower the gas temperature in the passes to the dew point, then the controllably admitted pellet cleaning gas may be atmospheric air. Otherwise, heated combustion gas may be fed into the discharge passage. In either case, the air or gas admission is effected through a damper-controlled passage connected to the discharge passage.

For an understanding of the invention principles, reference is made to the following description of a typical embodiment thereof as illustrated in the accompanying drawing. In the drawing:

Fig. 1 is a side elevation view of a hopper discharge passage embodying the invention;

Fig. 2 is a top plan view of the discharge passage;

Fig. 3 is a vertical mid-section through the discharge hopper; and

Figure 4:
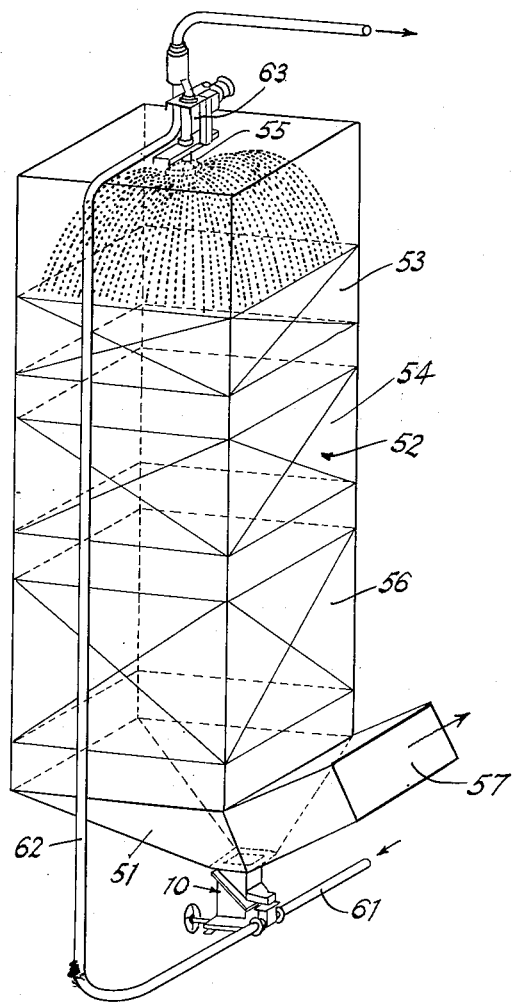
Fig. 4 is a diagrammatic isometric view of a vapor generator gas pass embodying the invention.

Referring to the drawing, the invention pellet cleaning arrangement is illustrated as incorporated in a hopper discharge passage 10 having an upper flange 11 for connection to the lower end of an ash hopper 51 disposed at the lower end of a downward flow gas pass 52 of a vapor generator or the like. Gas pass 52 may be the final gas pass and have serially disposed therein tubular heat exchangers such as a superheater 53, an economizer 54 and an air heater 56. From gas pass 52, the flue gases flow into a discharge passage 57 with, preferably, an abrupt change in direction for separation of gas-borne solids in suspension. A lower flange 12 of passage 10 may be connected to a discharge pipe leading to a wet conveyor or other ash disposal means.

The heat exchangers in gas pass 52 are arranged for cleaning of combustion gas deposited solids from their tube surfaces by gravity flow of relatively hard pellets over the surfaces. These pellets are substantially uniformly distributed over the horizontal cross-sectional area by an axially fed centrifugal distributor 55 mounted, for rotation about a vertical axis, beneath the roof of the gas pass and above superheater 53. The pellets and the dislodged solids flow downwardly into the ash hopper 51 and thence into passage 10.

The latter is divided, midway of its length and along a plane inclined to the horizontal at about 45°, into upper and lower sections 13 and 14 having mating flanges 16, 17. Between flanges 16, 17 is secured a U-shaped frame 15 slidably receiving a frame 18 carrying a screen 20, frame 18 having a handle 21. The screen 20 is so constructed and arranged as to bar the flow of pellets therethrough while passing at least the smaller sizes and fines of the dislodged solids.

The pellets caught by screen 20 flow downwardly therealong toward the lower edge of the screen and thence into a discharge pipe 22 including a sloping section 23 connected to a vertical section 24. The latter has a flange 26 on its lower end mating with a flange 27 on a side inlet 28 of a conveyor nozzle 25. Between flanges 26 and 27 is slidably disposed a flat gate 30 controlling passage into inlet 28.

A coupling flange 31 at one end of nozzle 25 connects this end to conduit 61, a source of air under pressure. A similar flange 32 at the discharge end of the nozzle is connected to a line 62 leading to a separator 63 where the pellets are returned to the pellet distributor 55.

Gas is admitted to passage 10 beneath screen 20 by means of a side inlet 35 having a flange 36 for connection to an air supply or to a flue gas passage. Flow of gas into passage 10 is regulated by a damper 40 on a rock shaft 41 having an operating pulley 42.

The gas admitted through inlet 35 is sucked upwardly through passage 10 and screen 20 by virtue of the furnace draft existing in the ash hopper connected to the upper flange 11 of passage 10. By adjustment of damper 40, the rate of gas flow upwardly through screen 20 is so controlled as to prevent counterflow of at least the smaller size dislodged particles toward the screen while permitting the relatively heavier pellets to fall onto the screen for discharge to nozzle 25. Thus, essentially only relatively cleaned pellets flow into the nozzle, reducing the load on the pellet return system as compared to that when both the pellets and adhered solids flow into the return system.

Damper 40 is opened only during the cleaning period. When the cleaning period is terminated, the damper is closed, interrupting the admitted gas flow upwardly through passage 10. Any solids or ash can then flow from the ash hopper through passage 10 in the usual manner. Screen 20 is removed by use of handle 21 in such a manner as to dislodge the accumulated solids thereon into passage 10 for discharge into the ash removal means or slag tank.

If the flue gas temperature is sufficiently high that cold air admission will not reduce the temperature to the dew-point, then atmospheric air may be admitted through inlet 35. Otherwise, and if the flue gas would be reduced to the dew-point by air admission, inlet 35 can be connected, by flange 36, to a line leading to a flue gas passage for admission of heated gas into passage 10.

While a specific embodiment of the invention has been shown and described in detail to illustrate the application of the invention principles, it will be understood that the invention may be embodied otherwise without departing from such principles.

What is claimed is:

1. In a tubular heat exchanger having exterior tube surfaces contacted by gases carrying solids in suspension which deposit on such surfaces and an ash hopper disposed below the heat exchange surfaces and communicating with a downwardly extending hopper discharge passage, and incorporating tube cleaning apparatus of the type including distributor means above the heat exchange surfaces for distributing relatively hard pellets for gravity flow over the surfaces to dislodge such solids therefrom and conveyor means for receiving pellets from the hopper discharge passage and returning the pellets to the distributor means; the improvement comprising a screen disposed completely across said discharge passage beneath the ash hopper and at an inclination to the horizontal, the perforations of said screen being of a size to retain the pellets on the screen while passing said solids; pellet directing means extending laterally of said discharge passage from the lower portion of said screen to the conveyor means; and controllable means operable to effect a gas flow upwardly of said discharge passage through said screen, responsive to the pressure differential resulting from the flow of such solid-carrying gases through the heat exchanger, at a rate sufficient to inhibit passage of the solids downwardly with the pellets.

2. In a tubular heat exchanger having exterior tube surfaces contacted by gases carrying solids in suspension which deposit on such surfaces and an ash hopper disposed below the heat exchange surfaces and communicating with a downwardly extending hopper discharge passage, and incorporating tube cleaning apparatus of the type including distributor means above the heat exchange surfaces for distributing relatively hard pellets for gravity flow over the surfaces to dislodge such solids therefrom and conveyor means for receiving pellets from the hopper discharge passage and returning the pellets to the distributor means; the improvement comprising a screen disposed completely across said discharge passage beneath the ash hopper and at an inclination to the horizontal, the perforations of said screen being of a size to retain the pellets on the screen while passing said solids; pellet directing means extending laterally of said discharge passage from the lower portion of said screen to the conveyor means; and damper controlled means operable to effect a gas flow upwardly of said discharge passage through said screen, responsive to the pressure differential resulting from the flow of such solid-carrying gases through the heat exchanger, and through the ash hopper at a rate sufficient to inhibit passage of the solids downwardly with the pellets.

3. In a tubular heat exchanger having exterior tube surfaces contacted by gases carrying solids in suspension which deposit on such surfaces and an ash hopper disposed below the heat exchange surfaces, and incorporating tube cleaning apparatus of the type including distributor means above the heat exchange surfaces for distributing relatively hard pellets for gravity flow over the surfaces to dislodge such solids therefrom and conveyor means for receiving pellets from the hopper and returning the pellets to the distributor means; the improvement comprising a hopper discharge passage leading downwardly from the ash hopper; a screen disposed completely across said passage at an inclination to the horizontal; pellet directing means extending laterally of said discharge passage from the lower portion of said screen to the conveyor means; and controllable means operable to effect a gas flow upwardly through said screen, responsive to the pressure differential resulting from the flow of such solid-carrying gases through the heat exchanger, at a rate sufficient to inhibit passage of the solids downwardly with the pellets.

4. In a tubular heat exchanger having exterior tube surfaces contacted by gases carrying solids in suspension which deposit on such surfaces and an ash hopper disposed below the heat exchange surfaces, and incorporating tube cleaning apparatus of the type including distributor means above the heat exchange surfaces for distributing relatively hard pellets for gravity flow over the surfaces to dislodge such solids therefrom and conveyor means for receiving pellets from the hopper and returning the pellets to the distributor means; the improvement comprising a hopper discharge passage leading downwardly from the ash hopper; a screen disposed completely across said passage at an inclination to the horizontal; pellet directing means extending laterally of said discharge passage from the lower portion of said screen to the conveyor means; and a damper controlled connection to said passage beneath said screen operable to effect a gas flow into said passage and upwardly through said screen at a rate sufficient to inhibit passage of the solids downwardly with the pellets.

5. In a tubular heat exchanger having exterior tube surfaces contacted by gases carrying solids in suspension which deposit on such surfaces and an ash hopper disposed below the heat exchange surfaces, and incorporating tube cleaning apparatus of the type including distributor means above the heat exchange surfaces for distributing relatively hard pellets for gravity flow over the surfaces to dislodge such solids therefrom and conveyor means for receiving pellets from the hopper and returning the pellets to the distributor means; the improvement comprising a hopper discharge passage leading downwardly from the ash hopper; a screen removably disposed completely across said passage at an inclination to the horizontal; pellet directing means extending laterally of said discharge passage from the lower portion of said screen to the conveyor means; and a damper controlled connection to said passage beneath said screen operable to effect a gas flow into said passage and upwardly through said screen at a rate sufficient to inhibit passage of the solids downwardly with the pellets.

6. In a tubular heat exchanger having exterior tube surfaces contacted by gases carrying solids in suspension which deposit on such surfaces and an ash hopper disposed below the heat exchange surfaces, and incorporating tube cleaning apparatus of the type including distributor means above the heat exchange surfaces for distributing relatively hard pellets for gravity flow over the surfaces to dislodge such solids therefrom, a pellet intercepting screen disposed in the path of flow through the ash hopper, and conveyor means for receiving pellets from the hopper and returning the pellets to the distributor means; the improved method of operating the cleaning apparatus comprising, during discharge of pellets over the heat exchange surfaces, directing a gas flow upwardly through the screen at a rate sufficient to inhibit passage of the solids downwardly with the pellets; and, after termination of the cleaning operation, interrupting such gas flow to provide for the solids to pass downwardly through the screen by gravity.

7. In a tubular heat exchanger having exterior tube surfaces contacted by gases carrying solids in suspension which deposit on such surfaces and an ash hopper disposed below the heat exchange surfaces, and incorporating tube cleaning apparatus of the type including distributor means above the heat exchange surfaces for distributing relatively hard pellets for gravity flow over the surfaces to dislodge such solids therefrom, a pellet intercepting screen disposed in the path of flow through the ash hopper, and conveyor means for receiving pellets from the hopper and returning the pellets to the distributor means; the improved method of operating the cleaning apparatus comprising, during discharge of pellets over the heat exchange surfaces, directing a heated gas flow upwardly through the screen at a rate sufficient to inhibit passage of the solids downwardly with the pellets.

8. In a tubular heat exchanger having exterior tube surfaces contacted by gases carrying solids in suspension which deposit on such surfaces and an ash hopper disposed below the heat exchange surfaces, and incorporating tube cleaning apparatus of the type including distributor means above the heat exchange surfaces for distributing relatively hard pellets for gravity flow over the surfaces to dislodge such solids therefrom, a pellet intercepting screen disposed in the path of flow through the ash hopper, and conveyor means for receiving pellets from the hopper and returning the pellets to the distributor means; the improved method of operating the cleaning apparatus comprising, during discharge of pellets over the heat exchange surfaces, controllably directing a heated gas flow upwardly through the screen at a rate sufficient to inhibit passage of the solids downwardly with the pellets; and, after termination of the cleaning operation, interrupting such gas flow to provide for the solids to pass downwardly through the screen by gravity.

References Cited in the file of this patent

UNITED STATES PATENTS

| Number | Name | Date |
|---|---|---|
| 1,737,693 | Webb et al. | Dec. 3, 1929 |
| 1,795,348 | Schmidt | Mar. 10, 1931 |
| 1,871,166 | Fahrbach | Aug. 9, 1932 |
| 2,576,058 | Weber | Nov. 20, 1951 |
| 2,665,119 | Broman | Jan. 5, 1954 |

FOREIGN PATENTS

| Number | Country | Date |
|---|---|---|
| 573,416 | Germany | Apr. 2, 1931 |